V. LINDEN.
TRACTION WHEEL.
APPLICATION FILED FEB. 8, 1918.
1,284,385.
Patented Nov. 12, 1918.
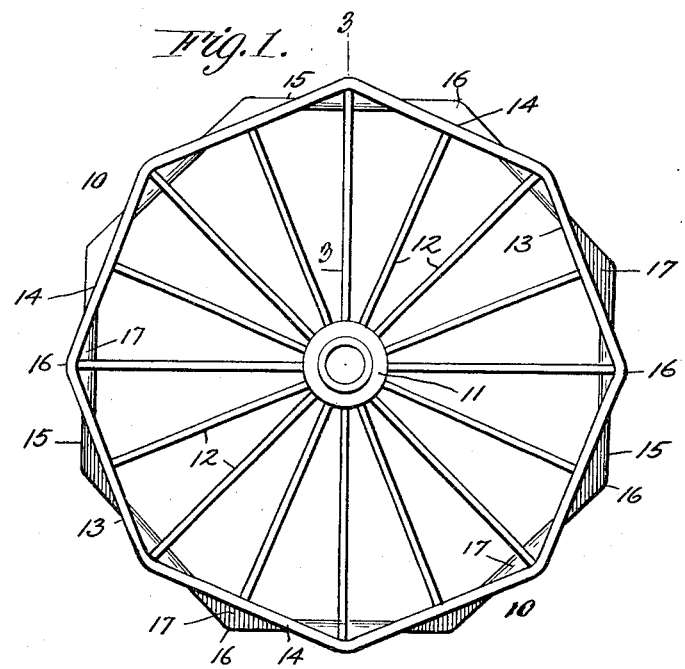
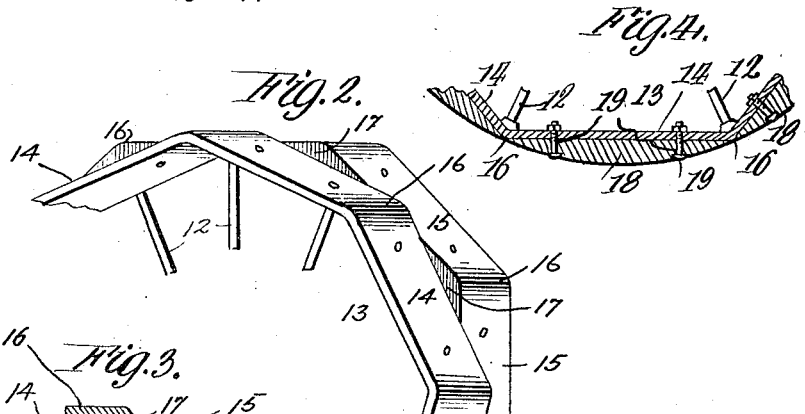
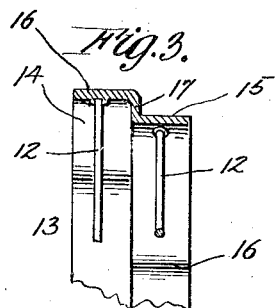
INVENTOR
Victor Linden
WITNESSES
BY
ATTORNEY

UNITED STATES PATENT OFFICE.

VICTOR LINDEN, OF HOLLISTER, CALIFORNIA.

TRACTION-WHEEL.

1,284,385.  Specification of Letters Patent.  Patented Nov. 12, 1918.

Application filed February 8, 1918. Serial No. 216,046.

*To all whom it may concern:*

Be it known that I, VICTOR LINDEN, a subject of the King of Sweden, residing at Hollister, in the county of San Benito and State of California, have invented certain new and useful Improvements in Traction-Wheels, of which the following is a specification.

This invention relates to an improvement in wheels and particularly to wheels for self propelled traction vehicles and has for its object to provide a simple, strong and efficient wheel particularly designed for driving the vehicle over soft and sandy ground; the wheel being so constructed that the portion in contact with the ground will be sufficiently irregular to obtain a firm grip on the ground and at the same time to present at all times in contact with the ground a surface sufficiently broad to uphold the wheel on soft and sandy soil.

A further object of the invention is to provide in such a wheel, means readily attachable to the tread surface thereof for rendering such surface smooth and of circular outline to enable the vehicle to be driven without inconvenience over smooth and hard roads.

With the above objects in view, the invention consists in the novel construction, combination and arrangement of parts, hereinafter described, pointed out in the appended claims and illustrated in the accompanying drawings, in which;

Figure 1 is a side elevation of the improved wheel.

Fig. 2 is a perspective view of a portion of the rim of the wheel showing the novel construction thereof, Fig. 3 is a cross sectional view on the line 3—3 of Fig. 1, and, Fig. 4 is a detail view in section showing the wheel fitted for travel on smooth and hard roads.

In the drawings, 10 indicates the wheel as a whole having a hub 11 and spokes 12 of any well known construction, and a rim 13 of novel form now to be described.

The rim 13 is preferably made of plate metal rolled or pressed into shape and connected to the outer ends of the spokes 12 by riveting, screwing or other form of connection, well known to those skilled in the art. The rim 13 at one side of the wheel is of regular polygonal form having eight, twelve or more faces 14 as are required, the number depending more or less on the diameter of the wheel. The rim at the opposite side of the wheel is of similar formation, the faces 15 however, being offset from the faces 14 so that each face on both sides of the wheel will be centrally in line with the angle 16 between the ends of the faces on the opposite side of the wheel. By this construction, the wheel will have a number of angular projections on its bearing surface to grip the surface of the ground and an equal number of flat faces to support the weight of the vehicle and prevent the wheel from sinking in the ground. The dividing line between the two polygonal sides of the rim lies in a plane perpendicular to the axis of the wheel; the bearing faces 14 and 15 of the two sides are therefore of equal area and when a face of one side of the wheel is in contact with the ground, there is an angular projection at the other side also engaging the ground in its most efficient position. The inner side of each angular projection is closed by a plate 17 to prevent the collection of dirt therein when traveling over soft ground.

When a vehicle provided with wheels as described, is to run over smooth and well kept roads, blocks 18 such as shown in Fig. 4 are fastened to the faces 14 and 15 of the wheel. These blocks are each of a length equal to a face and have a flat side to bear against said face and a curved side with a radius equal to the distance from the axis of the wheel to the extreme end of the angular projection 16. Bolts 19 pass through the block 18 and the adjacent face of the rim and are secured by nuts as shown. A wheel so equipped with blocks secured to the faces 14 and 15 presents a smooth circular tread surface having a width equal to that of the entire rim and will travel smoothly and satisfactorily over hard roads.

Having described my invention, I claim:

1. A traction wheel having a metal rim of duplex polygonal formation, the faces of one polygonal section offsetting circumferentially like faces of the other section.

2. A traction wheel having a metal rim of duplex polygonal formation, the faces of one polygonal section offsetting circumferentially like faces of the other section, and each face of each section having its longitudinal center in radial line with the angle formed between the connected ends of two adjoining faces of the other section.

3. A traction wheel having a metal rim of duplex polygonal formation, the faces of both polygonal sections being tangential to a common circle and equally spaced around the wheel.

4. A traction wheel having an integral metal rim of duplex polygonal formation divided by a plane perpendicular to the axis of the wheel into an inner and an outer polygonal section, said sections being offset circumferentially to provide coöperating flat surfaces comprising the polygonal faces, and angular projections, formed by the connected ends of the faces, to simultaneously contact with the ground as the wheel moves thereover.

5. A traction wheel having a metal rim formed with two rows of equally spaced angular projections thereon integral with the rim, said projections being offset from each other circumferentially of the wheel and also transversely, and a flat face at the side of a projection in each row formed by the prolongation and joining of the angular sides of the next two projections in the other row.

6. A traction wheel having a metal rim, the tread surface of which is formed with a plurality of equally flattened surfaces at one side and a similar number of like flattened surfaces at the other side, said surfaces being offset from each other to form angular projections on each side opposite the flat surfaces of the opposite side.

7. A traction wheel having a metal rim of duplex polygonal formation, the faces of one polygonal section offsetting circumferentially like faces of the other section, and a plurality of blocks each having a flattened surface and an opposite curved surface, said blocks adapted to be secured to the faces of the wheel to provide a smooth, unbroken tread for the wheel the full width of the rim.

In testimony whereof I affix my signature in presence of two witnesses.

VICTOR LINDEN.

Witnesses:
PETER L. SWANSON,
DAVID DALZELL.

Copies of this patent may be obtained for five cents each, by addressing the "Commissioner of Patents, Washington, D. C."